(12) United States Patent
Smith et al.

(10) Patent No.: US 8,500,214 B2
(45) Date of Patent: Aug. 6, 2013

(54) SYSTEM AND METHOD FOR CONTROL OF DISTRIBUTED POWER RAIL VEHICLE

(75) Inventors: Eugene A. Smith, Melbourne, FL (US); Derek Kevin Woo, Melbourne, FL (US); Robert Palanti, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 506 days.

(21) Appl. No.: 12/688,496

(22) Filed: Jan. 15, 2010

(65) Prior Publication Data

US 2010/0194186 A1 Aug. 5, 2010

Related U.S. Application Data

(60) Provisional application No. 61/150,133, filed on Feb. 5, 2009, provisional application No. 61/153,130, filed on Feb. 17, 2009.

(51) Int. Cl.
*B60T 13/66* (2006.01)
*B60T 7/16* (2006.01)

(52) U.S. Cl.
USPC ............................ 303/7; 303/15; 303/20

(58) Field of Classification Search
USPC ............... 303/9.63, 9.31, 128, 3, 7, 15, 20; 701/19–20
See application file for complete search history.

(56) References Cited

U.S. PATENT DOCUMENTS

| 4,553,723 A | 11/1985 | Nichols |
| 4,859,000 A | 8/1989 | Deno et al. |
| 5,369,587 A * | 11/1994 | Root et al. ........................ 701/70 |
| 6,375,275 B1 | 4/2002 | Smith, Jr. |
| 6,443,538 B1 * | 9/2002 | Smith et al. ................... 303/128 |
| 6,824,226 B2 | 11/2004 | Smith, Jr. |
| 2008/0087772 A1 * | 4/2008 | Smith ........................ 246/187 C |
| 2009/0223760 A1 * | 9/2009 | Smith ............................ 188/3 H |

* cited by examiner

*Primary Examiner* — Anna Momper
(74) *Attorney, Agent, or Firm* — GE Global Patent Operation; John A. Kramer

(57) ABSTRACT

In a system and method for controlling a distributed power rail vehicle consist, each of at least one powered rail vehicle in the rail vehicle consist is designated for operation as a remote trail. Based on the designation, a respective brake pipe valve of each of the at least one powered rail vehicle is automatically operated to a cut-out mode. Upon initiation of a service, an emergency, and/or a penalty brake application in the rail vehicle consist, the respective brake pipe valve of each of the at least one the powered rail vehicle is automatically operated to a cut-in mode. Upon completion of the service, emergency, and/or penalty brake application in the rail vehicle consist, the respective brake pipe valve of each of the at least one powered rail vehicle is automatically operated back to the cut-out mode.

20 Claims, 9 Drawing Sheets ic
SYSTEM AND METHOD FOR CONTROL OF DISTRIBUTED POWER RAIL VEHICLE This application claims priority to U.S. Provisional Application Ser. No. 61/150,133, filed Feb. 5, 2009, and to U.S. Provisional Application Ser. No. 61/153,130, filed Feb. 17, 2009, each hereby incorporated by reference herein in its entirety.

FIELD OF THE INVENTION

Certain embodiments of this invention relate to pneumatic braking systems. Other embodiments relate to braking control systems and pneumatic braking systems for rail vehicles.

BACKGROUND OF THE INVENTION

One of the most critical aspects of the operation of trains and other rail vehicles is the predictable and successful operation of the air brake system of the rail vehicle (assuming, of course, that the rail vehicle is of the type having air brakes). However, the air brake system is subjected to a variety of dynamic effects, not only as a result of the controlled application and release of the brakes in response to changes in brake pipe pressure, but also due to the varying operating conditions encountered by the rail vehicle. Thus, multiple operating scenarios must be considered for the successful design and operation of the air brake system.

In a train comprising a at least one locomotive and a plurality of other railcars (such as freight cars), at each railcar, a control valve (typically comprising a plurality of valves and interconnecting piping) responds to locomotive operator-initiated changes in the brake pipe fluid pressure by applying the brakes (in response to a decrease in the brake pipe fluid pressure) or by releasing the brakes (in response to an increase in the brake pipe fluid pressure). The fluid within the brake pipe conventionally comprises pressurized air. The control valve at each railcar senses the drop in brake pipe air pressure as the pressure drop propagates along the brake pipe. In response, at each railcar pressurized air is supplied from a local railcar reservoir to the wheel brake cylinders, which in turn drive the brake shoes against the railcar wheels. The railcar reservoir is charged by supplying air from the brake pipe during non-braking intervals. Typically, the pressure reduction in the brake pipe for signaling a brake application is about seven to twenty-six psi (from ~48 kPa to ~179 kPa), with a nominal steady state brake pipe pressure of about 90 psi (~621 kPa). The braking pressure applied to the railcar wheels is proportional to the drop in the brake pipe pressure. Thus, it can be seen that the brake pipe serves to both supply pressurized air to each railcar for powering the brake shoes during a brake application and also serves as the medium for communicating brake application and release instructions to each railcar.

The railcar brakes can be applied in two different modes, e.g., a service brake application or an emergency brake application. A service brake application involves the application of braking forces to the railcar to slow the train or bring it to a stop at a forward location along the track. During service brake applications the brake pipe pressure is slowly reduced and the brakes are applied gradually in response thereto. An emergency brake application commands an immediate application of the railcar brakes through an immediate evacuation or venting of the brake pipe. Unfortunately, because the brake pipe runs for hundreds of yards (meters) along the length of the train, the emergency braking evacuation does not occur instantaneously along the entire length of the brake pipe. Thus, the braking forces are not uniformly applied at each railcar to stop the train.

After one emergency brake application or two or three service brake applications, the brake pipe must be recharged to its nominal operating pressure by supplying pressurized air from a reservoir on the locomotive into the brake pipe. Effective subsequent brake applications cannot be made until the recharging process has been completed.

FIG. 1 illustrates a typical prior art brake system employed by a railway freight train. In a conventional train having only a lead locomotive, the train brake system comprises a locomotive brake system located on a locomotive 100 and a set of railcar brake systems located on a plurality of railcars illustrated by a railcar 200. The application and release of braking action is controlled by an operator within the locomotive 100, who uses a manually operated brake handle to effect a braking action. The locomotive includes an air brake control system 102 for supplying air pressure to or controllably venting a pressurized brake pipe 101 via a relay valve 117. The pressurized brake pipe 101 is in fluid communication with each of the railcars 200 of the train, as shown.

The locomotive brake control system 102 comprises an air supply input link 111 for supplying pressurized fluid (e.g., pressurized air) through which the brake pipe 101 is charged. A flow measuring adapter 113 ("flow means adapt") is connected to the air supply link 111 for measuring the charging rate (as a differential pressure between the air supply and output port 116) of the brake control system 102. The output port 116 of the flow measuring adapter 113 is connected to an input port 121 of a relay valve 117. A bi-directional port 122 of the relay valve 117 is coupled to the brake pipe 101. The relay valve 117 further includes a port 123 coupled through an air pressure control link 103 to an equalizing reservoir 105. The pressure control link 103 is also connected to a pressure control valve 107 through which the equalizing reservoir 105 is charged and discharged in the process of a brake operation. A port 124 of the relay valve 117 is controllably vented to the atmosphere as an exhaust port. Coupled with brake pipe 101 and air pressure control link 103 are respective pressure measuring and display devices 131 and 133. The brake pipe gauge 131 ("BP gauge") measures the air pressure in the brake pipe 101 and the equalizing reservoir gauge 133 ("ER gauge") measures the pressure in the equalizing reservoir 105.

The components of a railcar air brake control system 202 include a control valve 203 having a port 221 coupled to the brake pipe 101. The control valve 203 also includes a port 222 coupled to a pressure storage and reference reservoir 205. Finally, the control valve 203 includes a port 223 coupled to an air brake cylinder 231, comprising a piston 232 connected to a brake shoe 233. An increase in air pressure at the port 223 is fluidly communicated to the piston 232 for driving the brake shoe 233 against the wheels 235 of the railcar 200. Thus, the air brake control system 102 of the locomotive 100 controls operation of the pneumatically operated brake shoes 233 at each of the wheels 235 of each railcar 200.

During train operation, the brake pipe valve 120, through which the components of the brake control system 102 are coupled to the brake pipe 101, is open to create a continuous brake pipe fluid path between the locomotive 100 and all of the railcars 200 of the train. The brake pipe valve 120 is controlled by a brake valve cut-out valve 250, that is in turn, controlled by a pilot valve 251. The pilot valve 251 can be manually operated by the locomotive operator to close the brake pipe valve 120 when it is desired to terminate brake pipe charging. There are also other valves and control components (not shown in FIG. 1) that automatically terminate brake pipe charging during an emergency brake application by activating the pilot valve 251, which closes the brake pipe valve 120. Each railcar 200 also includes a manually-operated brake pipe valve 240, as shown in FIG. 1. A sensor 252 is provided for detecting a brake pipe fluid pressure in the brake pipe line 101.

The brake system is initially pressurized by the operation of the pressure control valve 107, which controls the air supply to the control link 103 to charge the equalizing reservoir 105 to a predetermined pressure. The relay valve 117 is then operated to couple port 121 with the port 122 so that air is supplied there through to the brake pipe 101, charging the brake pipe 101 to the predetermined charge pressure, as established by the pressure of the equalizing reservoir 105. When the brake pipe pressure reaches the predetermined pressure, the pressure at the port 122 (connected to the brake pipe 101) equals the pressure at the port 123 (connected to the equalizing reservoir 105). This condition indicates a charged brake pipe and the fluid flow path from the air supply port 121 to the brake pipe 101 via the relay valve 117 is closed.

The pressure storage and reference reservoir 205 of each railcar 200 is fully charged from the brake pipe 101 through the control valve 203, thereby establishing a reference pressure for maximum withdrawal of the piston 232 and complete release of the brakes 233 for each of the railcars 200.

To brake the railcars 200, the train operator operates the pressure control valve 107 using the braking handle in the locomotive cab. This operation causes a partial venting of the air pressure control link 103 through the exhaust port of the pressure control valve 107, reducing the pressure within the equalizing reservoir 105. This pressure reduction is sensed by the relay valve 117 at the port 123. In turn, the pressure reduction causes the bi-directional port 122 to be coupled to the exhaust port 124, thereby exhausting the brake pipe 101 to the atmosphere. The venting of the brake pipe 101 continues until the pressure within the brake pipe 101 equals the pressure of equalizing reservoir 105.

As the pressure in the brake pipe 101 falls, the control valve 203 in each of the cars 200 senses the pressure reduction by comparing the brake pipe pressure with the pressure storage and reference reservoir pressure. This pressure reduction causes a corresponding increase in the air pressure applied to the brake cylinder 231 from the port 223, resulting in an application of the brake shoes 233 against the wheels 235 in proportion to the sensed pressure reduction in the brake pipe 101.

Further pressure reductions in the equalizing reservoir 105 by the train operator produce corresponding pressure reductions in the brake pipe 101 and corresponding additional braking effort by the brake shoes 233 in each of the railcars 200. In summary, the intended operation of the brake system in the cars 200, and specifically the braking effort applied in each of the cars 200, is proportional to the reduction in pressure in the equalizing reservoir 105 within the locomotive 100.

When the locomotive operator desires to release the train car brakes, he/she operates the pressure control valve 107 via the braking handle, to effectuate a recharging of the air brake system 102. The recharging is accomplished by bringing the pressure within the equalizing reservoir 105 back to its fully charged state by supplying pressurized air via the air supply. With the equalizing reservoir 105 recharged, there is again a pressure differential (but opposite in sign to the previous pressure drop in the pressure line 103) between the ports 122 and 123 of the relay valve 117 that causes the brake pipe 101 to be charged with pressurized air from air supply 111 through the flow measuring adapter 113 and the relay valve 117. The brake pipe pressure increase is sensed by the control valve 203 in each of the railcars 200 to cause the brake shoes 233 to be released by the action of the brake cylinder 231.

Distributed power train operation supplies motive power from a lead locomotive and one or more remote locomotives spaced apart from the lead unit in the train consist. ("Consist" referring to a series of vehicles linked together to travel in concert.) Distributed train operation may be preferable for long trains to improve train handling and performance. Each lead and remote locomotive includes an air brake control system, such as the air brake control system 102 discussed above, and a communications system for exchanging information between the lead and the remote units. Typically, the communications system comprises a radio frequency link and the necessary receiving and transmitting equipment at each of the lead and the remote units.

On certain distributed power trains, braking is accomplished by venting the brake pipe 101 at both the lead and remote locomotives, thus accelerating the brake pipe venting and the application of the brakes at each railcar, especially for those railcars near the end of the train. Brake pipe venting at only the lead unit requires propagation of the brake pipe pressure reduction along the length of the train, thus slowing brake applications at railcars distant from the lead unit. For a distributed power train with an operative communications link between the lead and remote units, when the train operator commands a brake application by operation of the brake handle at the lead unit, a brake application command is transmitted to each remote unit over the radio frequency communications link. In response, each remote unit also vents the brake pipe through its respective relay valve 117. Thus braking actions at the remote locomotives follow the braking actions of the lead unit in response to signals transmitted by the communications system. As a result, the entire brake pipe is vented faster than if the venting occurred only at the lead locomotive. A brake release initiated at the lead unit is also communicated over the radio frequency link to the remote units so that the brake pipe 101 is recharged from all locomotives.

If the communications system is inoperative or if the communications link between the lead unit and the remote units is disrupted (for example, if line-of-sight directivity is lost due to track topology or an interfering object), when the lead operator makes a brake application the remote locomotives will not receive the brake application command via the communications system. Thus, the brake application is executed by venting the brake pipe only at the lead locomotive, resulting in a slower brake application at all the railcars.

It is known that leaks can develop in the brake pipe, causing unwanted pressure reductions. Thus, in one operational mode for a distributed power train, the remote units (and the lead unit) continually charge the brake pipe 101 when the pressure falls below a nominal value (i.e., whenever a brake application is not in progress). A remote unit senses the brake pipe pressure via the relay valve 117 that compares the equalizing reservoir pressure with the brake pipe pressure. Whenever the brake pipe pressure is less than the equalizing reservoir pressure, the brake pipe 101 is charged from the air supply 111 via the relay valve 117 of the remote unit. However, a remote unit should not recharge the brake pipe when a brake application has been initiated at the lead unit.

A dangerous scenario can develop if a brake application command transmitted over the communications link from the lead unit does not reach the remote locomotive while the latter is monitoring and recharging the brake pipe to compensate for pressure reductions caused by leaks within the brake pipe 101. Typically, the recharging process is initiated if the brake pipe pressure falls below a nominal predetermined value. In this situation the remote locomotive continues to recharge the brake pipe 101 as the lead unit is venting the brake pipe to signal a brake application to the railcars 200. This situation can cause dangerously high in-train forces to develop.

One prior art technique for avoiding this scenario is to automatically close the brake pipe valve 120 of the remote unit whenever communications is lost between the lead and the remote locomotive units. With the brake pipe valve 120 closed, the remote units cannot recharge (or vent) the brake pipe 101. Thus, all brake signaling (both brake applications and brake releases) over the brake pipe 101 is initiated from the lead unit. Although under this condition the remote locomotives cannot assist with the brake pipe venting to accelerate brake applications at the railcars 200, the remote locomotives also cannot erroneously recharge the brake pipe while the lead unit is venting it.

The LOCOTROL® distributed power communications system (available from the General Electric Company of Schenectady, N.Y.) incorporates a variant of the technique described above by including a brake pipe flow sensing function at each remote locomotive in a distributed power train. A flow sensor, such as the flow measuring adapter 113 as depicted in FIG. 1, is included in the brake pipe charging path at each remote unit to detect air flow from the air supply through the relay valve 117 to the brake pipe 101. If the flow rate (which is determined by a differential pressure) exceeds a predetermined value, a brake application is declared. That is, the brake pipe pressure has fallen to a value consistent with a brake application (which would have been initiated from the lead locomotive). If concurrently the communications system is inoperative, then in response to the simultaneous occurrence of these two events, the remote unit brake pipe valve 120 is commanded to a cut-out or closed position. Proper execution of the command closes the remote unit brake pipe valve 120. As a result, the brake application initiated by the venting of the brake pipe at the lead unit cannot be countered by pressurizing of the brake pipe at the remote unit.

If the command to cut-out or close the brake pipe valve 120 is not properly executed, then the brake valve at the remote unit remains open. There are several possible causes for this scenario, including a failure of the brake valve cut-out valve 250 (i.e., the valve that drives the brake pipe valve into a cut-off or closed configuration), a failure of the pilot valve 251 that drives the brake valve cut-out valve, or a brake pipe valve 120 stuck in the open position. Thus, if the brake pipe valve is not closed or cut-out as commanded, and during a communications system failure the lead unit issues a brake application, then the remote units continue to supply brake pipe recharging pressure while the lead unit is venting the brake pipe to apply the railcar brakes. This sets up an undesirable situation where the front railcars experience maximum braking and rear railcars experience minimum or no braking action. The net result is that the rear of the train can run into the front of the train, causing high in-train forces and possible derailment.

In very long conventional trains, when the operator makes a brake application, the brake pipe pressure must be exhausted from the front or leading locomotive. Since the brake pipe length is very long, the front part of the train will be heavily applying the brakes while the rear part of the train may still be reducing its brake pipe and the resulting car braking reduced. This situation sets up a similar undesirable situation as above where the front part of the train has full braking and the rear part of the train has minimal braking resulting in potentially high in-train forces, which could possibly cause a derailment.

The situation above becomes more pronounced in distributed power trains where train lengths are much longer than conventional trains. With good communications between the lead and remote, train braking is applied simultaneously at both the front of the train via the lead locomotive and the rear part of the train via the remote locomotive. This provides an even reduction in brake pipe pressure throughout the train, which results in a more uniform braking effort by the cars resulting in lower in-train forces. When communications are disrupted in a distributed power train, and the operator makes a brake application, then the undesirable situation of heavy braking at the front of the train and minimal braking at the rear of the train still occurs. Even with the remote locomotive detecting the brake application and cutting out the brake valve, the brake pipe pressure must still be exhausted by the lead locomotive, which results in the front part of the train having full braking and the rear part of the train having minimal braking.

On very long distributed power trains where there are a large number of cars located behind the remote locomotive, when a penalty brake application is applied on the train, the remote locomotive must exhaust the brake pipe from the cars in front of it and also from the cars behind it. Since the remote locomotive is exhausting the brake pipe from two parts of the train at the same time, the application rate for the cars at the rear of the train is reduced which leads to the brakes applying slower at the rear of the train than for the cars at the front part of the train and high in-train forces are again experienced.

During the operation of a distributed power train, various circumstances may arise which trigger a penalty brake operation or application. Here, upon the occurrence of a designated stimulus, or based on certain operating conditions of the train (e.g., the train going over a designated speed limit, a determination that the train is in imminent threat of hitting another vehicle or other object, or the train passing a "stop" signal), a command is initiated for automatically causing the train's brake system in engage. That is, based upon the occurrence of certain conditions, operation of the train is "penalized" by automatically causing it to slow down and stop. The penalty brake application lasts a minimum time period (commonly referred to as the "penalty period"), such as 120 seconds, during which the fluid pressure within the brake pipe is minimized, causing a full application of the braking system to stop the train for the minimum time period.

Depending on train makeup and operating conditions, penalty brake applications may result in undesirably high in-train forces (e.g., forces that one car exerts on another due to inertia or otherwise) and/or derailments. It has been found that operating two remote locomotives in tandem, with the brake pipe valves 120 of both locomotives in an open or cut-in state will exhaust the brake pipe at a faster rate than a single remote locomotive alone and may help to reduced in-train forces arising during penalty brake applications. However, operating two remote locomotives in tandem in this manner may result in the brake systems of the two locomotives interacting with one another in an undesired manner. This may include, or result in, excessive unexpected flow alarms with resultant brake pipe valve cut-outs, improper distributed power sorting of the remote locomotives, and excessive flows from one or both remote locomotives (e.g., excessive flow of pressurized fluid into the brake pipe 101 and/or flow between the two remote locomotives due to slight brake valve variations). Additionally, simultaneous detection of unexpected flow may cause communication check message collisions.

To avoid such problems, it is possible to operate a second remote locomotive directly behind a first remote locomotive, with the brake pipe valve 120 of the second remote locomotive in a closed or cut-out state. However, this does nothing to alleviate excessive in-train forces during penalty brake applications, and does not provide the capability for the remote locomotive to assist with brake applications or releases (i.e., because the brake control system 102 of the remote locomotive is isolated from the brake pipe 101). Also, with its brake valve in a cut-out state, the remote locomotive will reduce its throttle to idle if radio communications are lost with the lead locomotive.

BRIEF DESCRIPTION OF THE INVENTION

An embodiment of the present invention relates to a method for controlling a distributed power rail vehicle consist, for example, a train. The method comprises designating each of at least one locomotive or other powered rail vehicle in the rail vehicle consist for operation as a remote trail. By designation as a "remote trail," this simply refers to designating each of the at least one powered rail vehicle for a particular mode of distributed power operation. In particular, based on the designation, a respective brake pipe valve of each of the at least one powered rail vehicle is automatically operated to a cut-out mode. ("Cut-out" mode refers to the brake pipe valve being closed, isolating the brake control system of the powered rail vehicle from the brake pipe of the rail vehicle consist. "Automatic" means without the requirement for human action. Also, "operated to a cut-out mode" includes the possibility of leaving the brake pipe valve in the cut-out mode, if it is already in the cut-out mode.) Upon initiation of a service, an emergency, and/or a penalty brake application in the rail vehicle consist, the respective brake pipe valve of each of the at least one the powered rail vehicle is automatically operated to a cut-in mode. ("Cut-in" mode refers to the brake pipe valve being opened, bringing the brake control system of the powered rail vehicle into fluid communication with the brake pipe of the rail vehicle consist.) Upon completion of the service, emergency, and/or penalty brake application in the rail vehicle consist, the respective brake pipe valve of each of the at least one powered rail vehicle is automatically operated back to the cut-out mode.

Another embodiment of the present invention relates to a method for controlling a distributed power rail vehicle consist, for example, a train having plural locomotives or other powered rail vehicles including a first powered rail vehicle, a second powered rail vehicle located adjacent to the first powered rail vehicle, and a third powered rail vehicle remote from the first and second powered rail vehicles. In an embodiment, the first powered rail vehicle is not electrically connected to the second powered rail vehicle, e.g., through an MU cable or otherwise. "Remote" means spaced apart by one or more railcars, such as freight cars or other unpowered rail cars. "Unpowered" means having no on-board traction system for self-propulsion, while "powered" means capable of self-propulsion. Unless otherwise specified, "adjacent" means directly next to, or not directly next to but not separated by unpowered rail cars, i.e., possibly spaced apart by one or more locomotives or other powered rail vehicles but not by unpowered rail vehicles. Designations such as "first," "second," "third," and so on are for identification purposes only, and are not meant to convey a particular order or sequence unless otherwise specified.

An embodiment of the method comprises, at the third powered rail vehicle (which may be, for example, a lead powered rail vehicle), designating the first (or "n") powered rail vehicle in the rail vehicle consist for operation as a remote trail. Based on this designation, the brake pipe valve of the first powered rail vehicle is automatically operated to a cut-out mode. Upon initiation of a service, an emergency, and/or a penalty brake application in the rail vehicle consist, the brake pipe valve of the first powered rail vehicle is automatically operated to a cut-in mode. Upon completion of the service, emergency, or penalty brake application in the rail vehicle consist, the brake pipe valve of the first powered rail vehicle is automatically operated back to the cut-out mode. Thus, so long as the first powered rail vehicle is designated for operation as a remote trail, the brake pipe valve of the first powered rail vehicle is automatically operated to the cut-in mode only for service, emergency, or penalty brake applications in the rail vehicle consist, and is otherwise automatically operated to remain in the cut-out mode.

Another embodiment of the present invention relates to a method for controlling a train or other distributed power rail vehicle consist. The method comprises, at a first powered rail vehicle in a rail vehicle consist, determining that a distributed power communication system of the rail vehicle consist has entered a communication loss state. "Communication loss state" refers to a state or condition where distributed power communications cannot be transmitted between the first powered rail vehicle and a second, remote powered rail vehicle. This may be due to signal interference, component failure, or the like. During the communication loss state, and if a brake pipe valve of the first powered rail vehicle is in a cut-out mode, a braking application in the rail vehicle consist is detected at the first powered rail vehicle. The braking application is detected based on pressure levels in the rail vehicle consist brake pipe at the first powered rail vehicle and excluding brake pipe flow data, that is, braking applications are determined without the use of brake pipe flow data.

"Brake pipe flow data" is data relating to brake pipe charging rates, determined by analyzing differential pressures across a pipe restriction. In particular, with the brake pipe value of a typical locomotive in a cut-out mode, it is not possible to measure brake pipe charging rates. Thus, in certain embodiments of the present invention, braking applications are determined based solely on brake pipe pressure levels (psi or kPa versus psi-differential or kPa-differential), for example, as measured at a single point in the brake pipe in the first powered rail vehicle.

In another embodiment, the brake pipe pressure levels are determined by taking multiple samples of a pressure level in the brake pipe across a time period. A flow estimation value is determined based on the brake pipe pressure levels and a scaling factor. The braking application is detected based on a comparison of the flow estimation value to a designated threshold. For example, if the flow estimation value is equal to or above the threshold, it may be determined that a braking application has occurred.

In another embodiment, the flow estimation value is determined by scaling the brake pipe pressure levels according to the scaling factor, and integrating the scaled brake pipe pressure levels over the time period. Unless otherwise specified, "integrating" refers generally to an integration operation, summation, or the like.

BRIEF DESCRIPTION OF THE DRAWINGS

Embodiments of the present invention can be more easily understood and the further advantages and uses thereof more readily apparent, when considered in view of the following detailed description when read in conjunction with the following figures, wherein.

In accordance with common practice, the various described features are not drawn to scale, but are drawn to emphasize specific features relevant to the invention. Reference characters denote like elements throughout the figures and text.

DETAILED DESCRIPTION OF THE INVENTION

Figure 1:
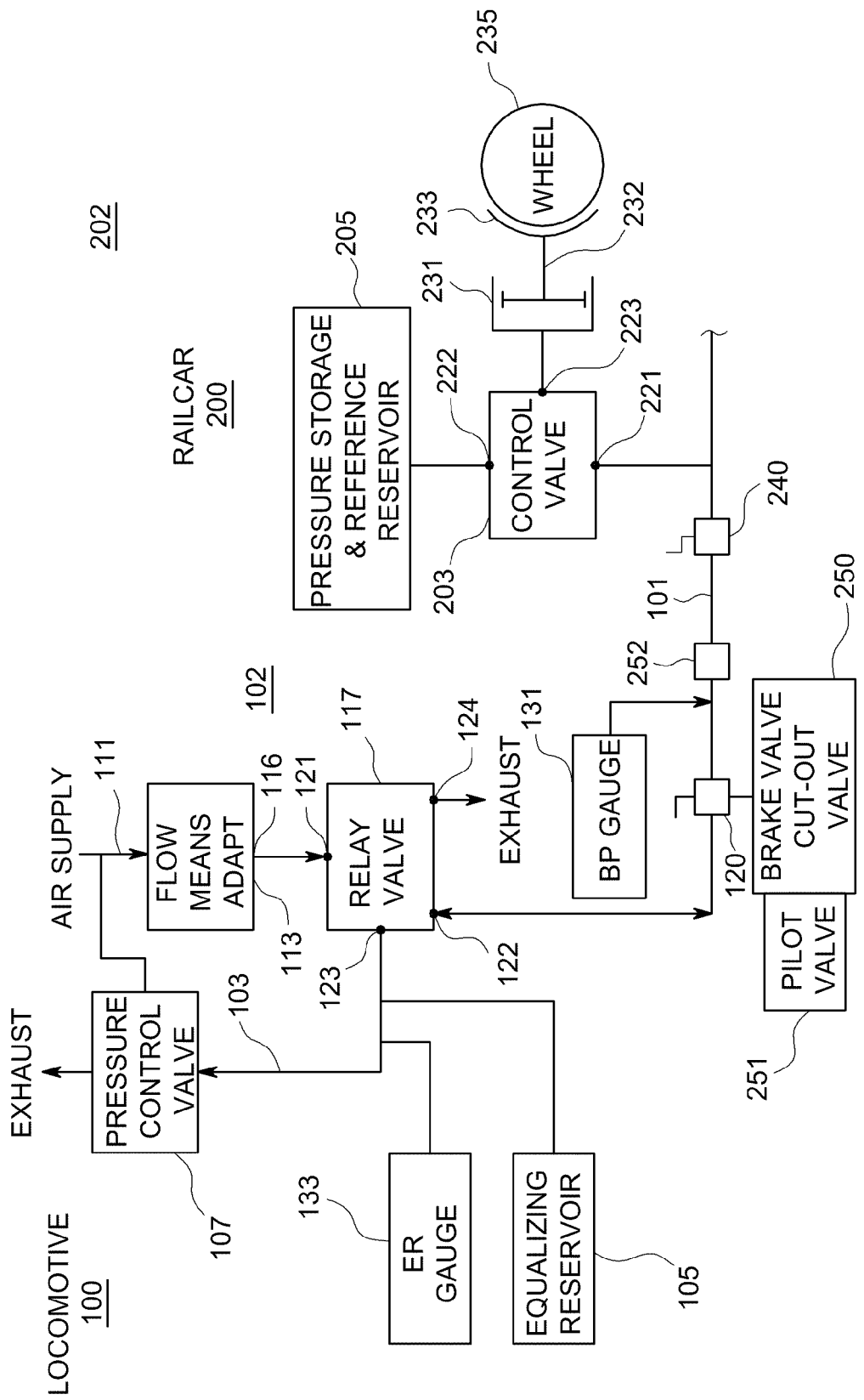
FIG. 1 is a schematic diagram of a prior art train braking system.

Before describing in detail the particular method and system for control of a distributed power rail vehicle in accordance with the present invention, it should be observed that the present invention resides primarily in a novel combination of hardware and/or software elements related to said method and system. Accordingly, the hardware and software elements have been represented by conventional elements in the drawings, showing only those specific details that are pertinent to the present invention, so as not to obscure the disclosure with structural details that will be readily apparent to those skilled in the art having the benefit of the description herein.

As noted above, designations such as "first" locomotive, "second" locomotive, "third" locomotive, and so on are for identification purposes only, and are not meant to convey a particular order or sequence unless otherwise specified. Additionally, although certain embodiments are described herein with respect to locomotives, this is for illustration purposes only, since the invention is more broadly applicable to powered rail vehicles generally. Thus, in the description set forth herein, any designations of "locomotive" are applicable to powered rail vehicles generally unless otherwise specified, such as in the claims.

Figure 2:
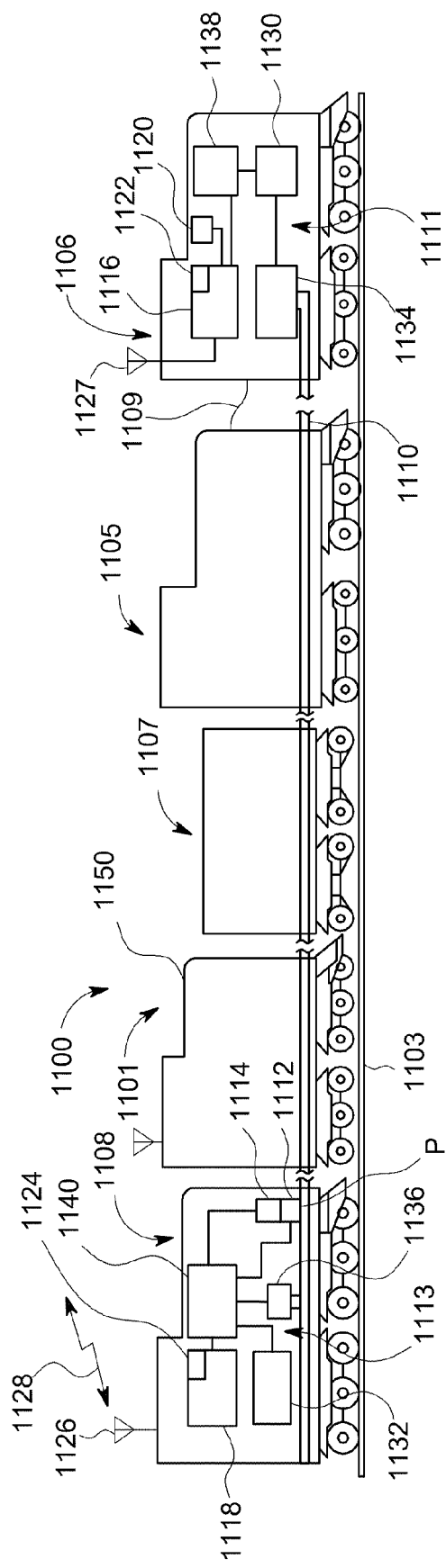
FIG. 2 is a schematic diagram of a distributed power rail vehicle consist and a system for control of the distributed power rail vehicle consist, according to an embodiment of the present invention.
Figure 3:
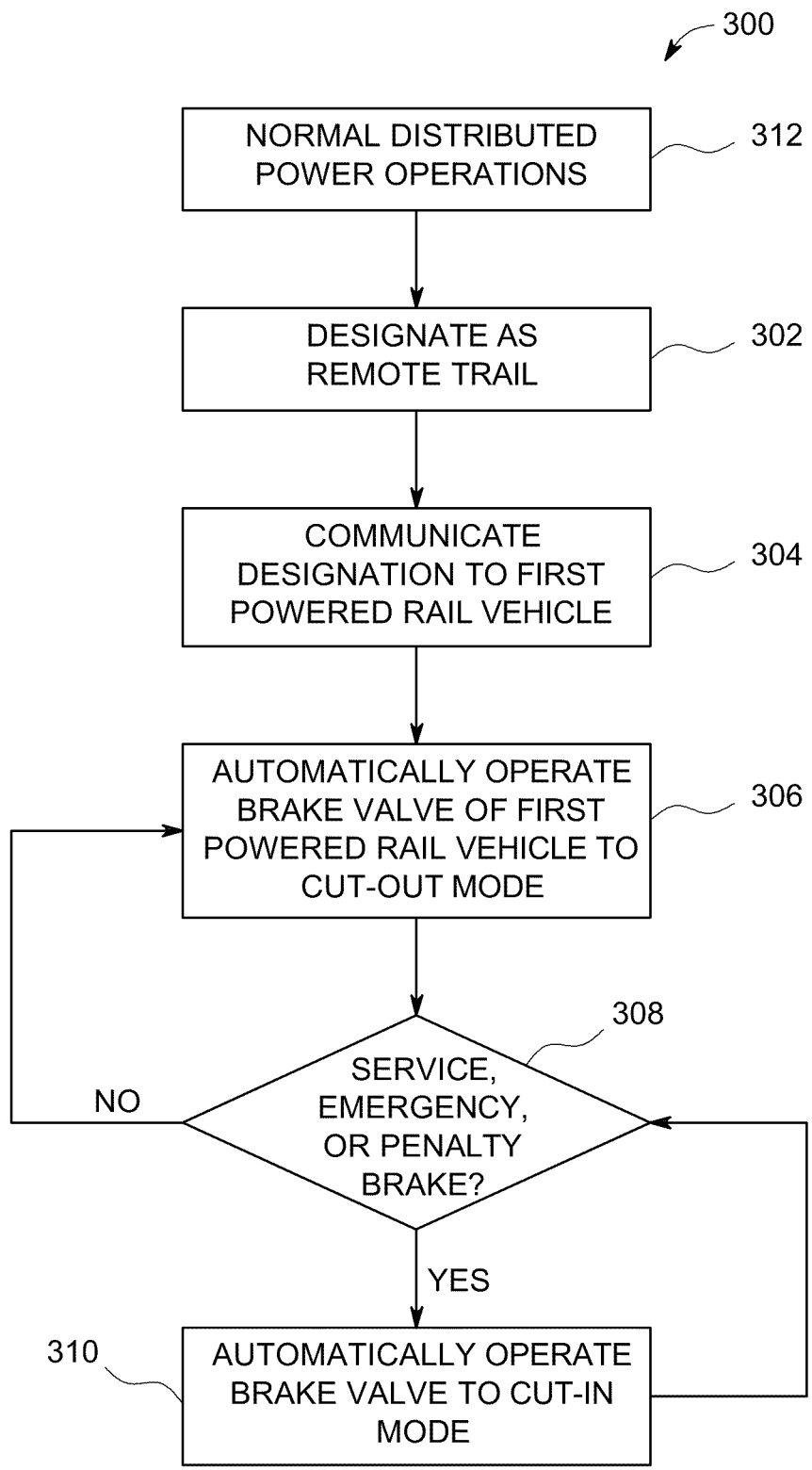
FIG. 3 is a flowchart illustrating a method for control of a distributed power rail vehicle consist, according to an embodiment of the present invention.

With reference to FIGS. 2 and 3 in overview, embodiments of the present invention relate to a system 1100 and a method 300 for controlling a distributed power rail vehicle consist 1101, e.g., a train. The method 300 comprises, at a third locomotive 1106 in a train 1101 (e.g., at a lead locomotive), designating a first locomotive 1108 in the train 1101 (e.g., a remote locomotive) for operation as a remote trail, as at Step 302. The first locomotive 1108 is remote from the third locomotive 1106, meaning the two are spaced apart by one or more rail cars 1107. The first locomotive 1108 is adjacent to a second remote locomotive 1150 in the train, but the two are not electrically connected. By designation as a "remote trail," this simply refers to designating the first locomotive 1108 for a particular mode of distributed power operation. In particular, based on this designation (e.g., the designation comprises a communication sent to the first locomotive, as at Step 304 in FIG. 3), the brake pipe valve 1136 of the first locomotive 1108 is automatically operated to a cut-out mode, as at Step 306. ("Cut-out" mode refers to the brake pipe valve being closed, isolating the brake control system (braking system) 1113 of the first locomotive 1108 from the brake pipe 1110 of the train. "Automatic" means without the requirement for human action. Also, "operated to a cut-out mode" includes the possibility of leaving the brake pipe valve in the cut-out mode, if it is already in the cut-out mode.) Upon initiation of a service brake application, an emergency brake application, and/or a penalty brake application in the train 1101, as at Step 308, the brake pipe valve 1136 of the first locomotive 1108 is automatically operated to a cut-in mode, as at Step 310. ("Cut-in" mode refers to the brake pipe valve being opened, bringing the brake control system of the first locomotive into fluid communication with the brake pipe 1110 of the train.) Upon completion of the service, emergency, or penalty brake application in the train, the brake pipe valve of the first locomotive is automatically operated back to the cut-out mode, as indicated by the return to Steps 308 and 306 in FIG. 3. (Completion of a penalty brake application may be gauged by expiration of a penalty brake application timer.) Thus, so long as the first locomotive is designated for operation as a remote trail, as at Step 302, the brake pipe valve of the first locomotive is operated to the cut-in mode only for service, emergency or penalty brake applications in the train (Step 310), and is otherwise operated to remain in the cut-out mode (Step 306). If the first locomotive is not designated as a remote trail, or is de-designated from operation as a remote trail, it returns to or remains in a normal mode of distributed power (DP) operation, as at Step 312, according to the particular configuration of the distributed power control system in place on the train 1101.

Embodiments of the invention allow a distributed power remote locomotive to be operated adjacent to another remote locomotive without causing the brake systems of the two locomotives to interact with each other. Other embodiments alleviate the problem of improper sorting of the remote locomotives. Other embodiments allow the remote locomotive to be operated with its brake valve cut-out, but still provide the capability to cut it back in to assist during brake applications or releases. Other embodiments allow the remote with its brake valve cut-out to continue to operate in traction during a communication loss.

FIG. 2 is a schematic diagram showing various parts of a distributed power train 1101 and the system 1100 for control of the distributed power train 1101, according to an embodiment of the present invention. (As should be appreciated, the system 1100 is applicable to distributed power trains having other constituent parts and/or configurations.) The distributed power train 1101, as illustrated, includes a third (lead) locomotive 1106, a trail locomotive 1105, a second (remote) locomotive 1150, a first (remote) locomotive 1108, and rail cars 1107 positioned between the lead locomotive consist (comprising the third/lead locomotive 1106 and the trail locomotive 1105) and the remote locomotive consist (comprising the first and second remote locomotives 1108, 1150). The third/lead locomotive 1106 and trail locomotive 1105 may be communicatively coupled with a trainline cable 1109 (commonly referred to as an "MU" cable), for example. The third/lead locomotive 1106 includes a lead braking system 1111 and the first/remote locomotive 1108 includes a remote braking system 1113. ("Braking system," "brake system," "braking control system," and "brake control system" are used synonymously herein.) The braking system 1111, 1113 includes a fluid carrying brake pipe 1110, which extends the length of the distributed power train 1101, and connects the third/lead locomotive 1106, the remote locomotives 1108, 1150, and the cars there between. The second (remote) locomotive 1150 is configured similarly to the first remote locomotive 1108 and the third/lead locomotive 1106. The third/lead locomotive is shown and described herein as being the front locomotive in the train, but this is for illustration purposes only and is not meant to be limiting, unless otherwise specified.

In terms of how the braking systems 1111, 1113 function to physically slow or stop a train, this is generally as set forth above in regards to FIG. 1.

As further shown in FIG. 2, for distributed power operations, the train 1101 includes a distributed power communication system. The system includes various transceiver devices for establishing a communication channel between locomotives, for the transmission of distributed power-related commands and other information. In particular, the third/lead locomotive 1106 and the first and second remote locomotives 1108, 1150 are linked through a wireless communication channel 1128, which is established using transceiver devices deployed on each distributed power-equipped locomotive. (FIG. 2 shows respective transceivers 1126, 1127 of the first locomotive 1108 and the third/lead locomotive 1106.) Additionally, the system 1100 may include sensors 1112, 1114 positioned within the distributed power train 1101, to measure a parameter related to the operation of the respective braking system 1111, 1113. For example, a fluid pressure sensor 1112 is coupled to the brake pipe 1110 adjacent to the first remote locomotive 1108, to measure a pressure within the brake pipe 1110 adjacent to the first remote locomotive 1108. Additionally, a speed sensor 1114 is positioned on the distributed power train 1101, such as on the first remote locomotive 1108, to measure a speed of the distributed power train 1101. An example of such a speed sensor may be an axle counter, which counts the number of rotations of the wheels of a locomotive, and, based on a known circumference of the wheels, can calculate the speed of the locomotive. In addition to being used for communicating with one another over the wireless link 1128, the transceivers 1126, 1127 may be global positioning system (GPS) transceivers, which are in communication with GPS satellites (not shown) to determine a location of the respective remote locomotives 1150, 1108 and the third/lead locomotive 1106. The speed sensor may be a GPS speed sensor that is coupled to the GPS transceiver 1126, and determines the speed of the distributed power train 1101 based on the position information provided by the GPS transceiver 1126 and time data provided by a clock, for example. The sensors 1112, 1114 are coupled to a remote processor 1118, positioned on the first remote locomotive 1108. Although FIG. 2 illustrates one pressure sensor and one speed sensor, each of which are positioned on the first locomotive 1108, the embodiments of the present invention are applicable for more than one pressure sensor and/or speed sensor, which may be positioned at a location other than the first locomotive 1108, for example.

As further illustrated in FIG. 2, the system 1100 includes a lead processor 1116 positioned within the third/lead locomotive 1106. ("Lead" processor refers to a processor in a lead locomotive, but this is merely an example. As mentioned above, embodiments are applicable, more generally, to a control processor in a third locomotive, that is, a processor configured to carry out one or more control functions of the third locomotive or train 1101. The processor may be specific to the control system 1100, or it may be a processor used in the locomotive/train for multiple purposes.) The lead processor 1116 includes a memory 1122 to store data used in the system 1100.

Figure 4:
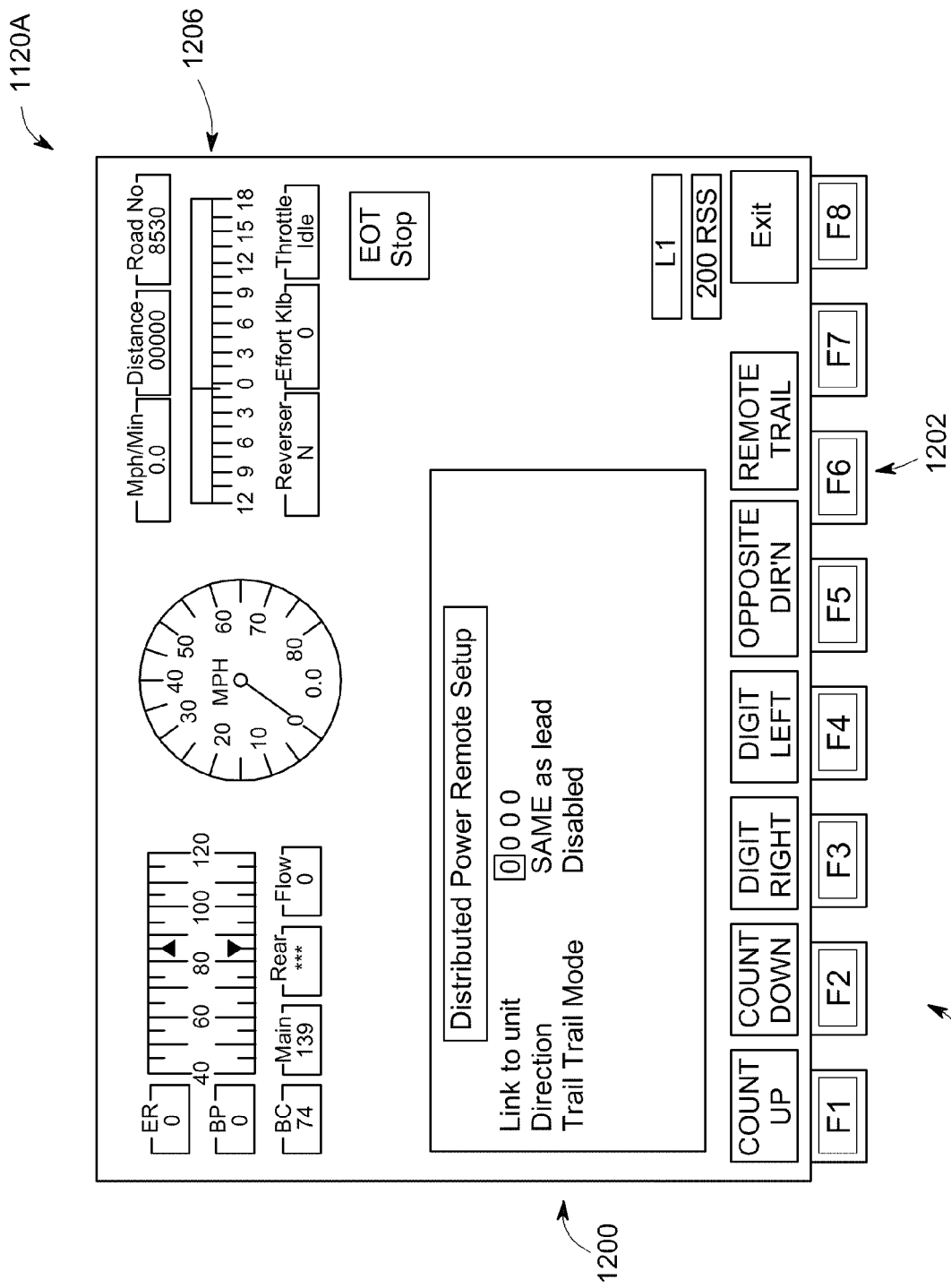
FIGS. 4 and 5 each show a display for displaying information to a vehicle operator, according to embodiments of the present invention.

The third/lead locomotive 1106 may include a display 1120 coupled to the lead processor 1116, for display of the remote trail designation or status of the first locomotive 1108 to an operator. See displays 1120A and 1120B in FIGS. 4-5. For example, as shown in FIG. 4, the display 1120A may include a graphical indication 1200 of the status of the remote trail mode of operation. The status may be with respect to each locomotive in the train; in particular, when a locomotive is selected for controlling or display of status, the remote trail status is indicated for that locomotive. For example, the display may include the selective display of "disabled" or "enabled," depending on whether the remote trail mode of operation is disabled or enabled for the particular locomotive in question, respectively. The display 1120A may also include a functional control element 1202, e.g., an operator selectable button or key (graphical or otherwise), for designating a selected locomotive into and out of the remote trail mode. The display 1120A may be a dedicated display, such as a remote trail control panel or electronic display, or it may be part of a control display that is also used for other purposes, such as a general locomotive/train operations display. FIG. 4, for example, shows additional control elements 1204 and train operations information 1206.

Figure 5:
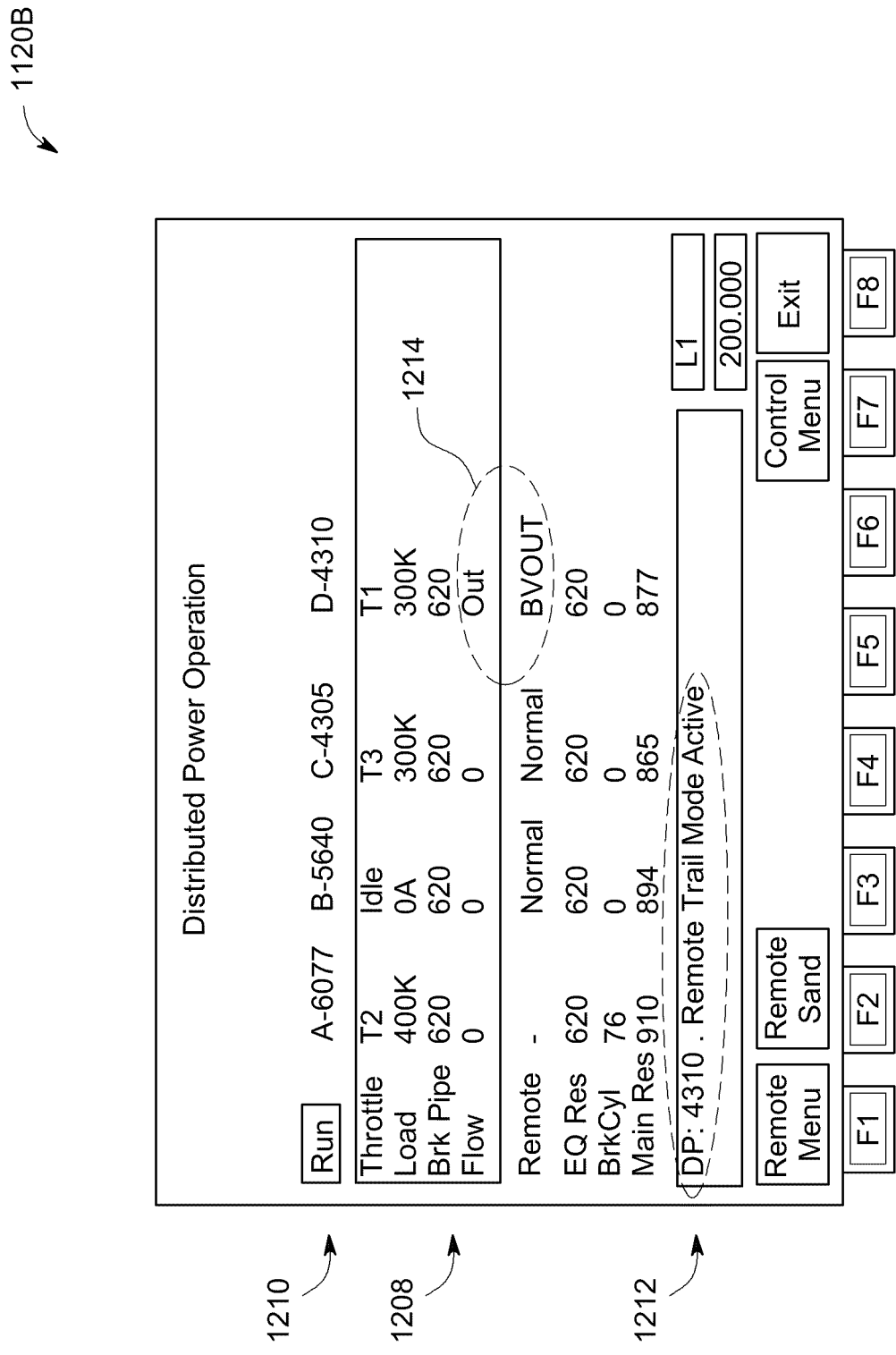

In an embodiment, the system 1100 additional includes the display 1120B as shown in FIG. 5. The display 1120B conveys information about distributed power operations in the train. This might include operations data 1208 for the various locomotives 1210 in the train, including respective throttle levels, load, brake pipe information, and flow information. Also displayed is the remote trail mode status 1212 of one or more locomotives in the train. For example, as shown in FIG. 5, a locomotive road number 4310 has been designated as a remote trail (indicated at 1212), and for the display entry of this locomotive the brake valve of the locomotive is shown as cut-out and the flow as "out" (see 1214). The display 1120B may be used in conjunction with display 1120A, e.g., the display 1120B could be accessible from display 1120A by selecting a particular function/option.

As further illustrated in FIG. 2, the remote processor 1118 is communicatively coupled to the lead processor 1116 over the wireless link 1128. (The first, remote locomotive 1108 may include a memory unit 1124 associated with the processor 1118.) The respective braking system 1111, 1113 of the third/lead locomotive 1106 and the first locomotive 1108 include a respective brake handle 1130, 1132, a respective brake valve 1134, 1136, and a respective brake processor 1138, 1140 coupled to the respective brake handle 1130, 1132 and the respective brake valve 1134, 1136.

As described above, embodiments of the invention define a new "remote trail" operating mode for a remote locomotive 1108. During the initial remote setup sequence, the remote (first) locomotive 1108 is configured/designated to operate in the remote trail mode, which allows the locomotive 1108 to operate in tandem with a lead locomotive or another remote locomotive. In the remote trail mode, the remote locomotive 1108 is operated with its brake valve 1136 in cut-out, which prevents the interaction of the brake systems of the two adjacent locomotives 1150, 1108. (The brake valve of the locomotive 1150 remains cut-in.) The remote trail locomotive 1108 monitors brake pipe pressure to determine the proper sorting and operation during communication interruption. As part of the linking sequence, the remote trail locomotive 1108 will indicate to the lead locomotive 1106 that it is operating in the remote trail mode, and when the lead locomotive completes the brake pipe test it will group the remote trail locomotive 1108 into the same remote group as the adjacent remote locomotive 1150, and both remote locomotives 1150, 1108 will then be controlled together during independent control operations. When a brake application or brake release command (service brake, emergency brake, and/or penalty brake) is received by the remote trail locomotive 1108, it cuts in its brake valve to assist with the brake application or release and then reverts back to the brake valve cut-out mode. Also, during communication loss with the lead locomotive 1106, the remote trail locomotive may continue in the last received throttle command until a brake application is sensed through the brake pipe 1110. Then, it will idle the remote trail locomotive 1108.

Figure 6:
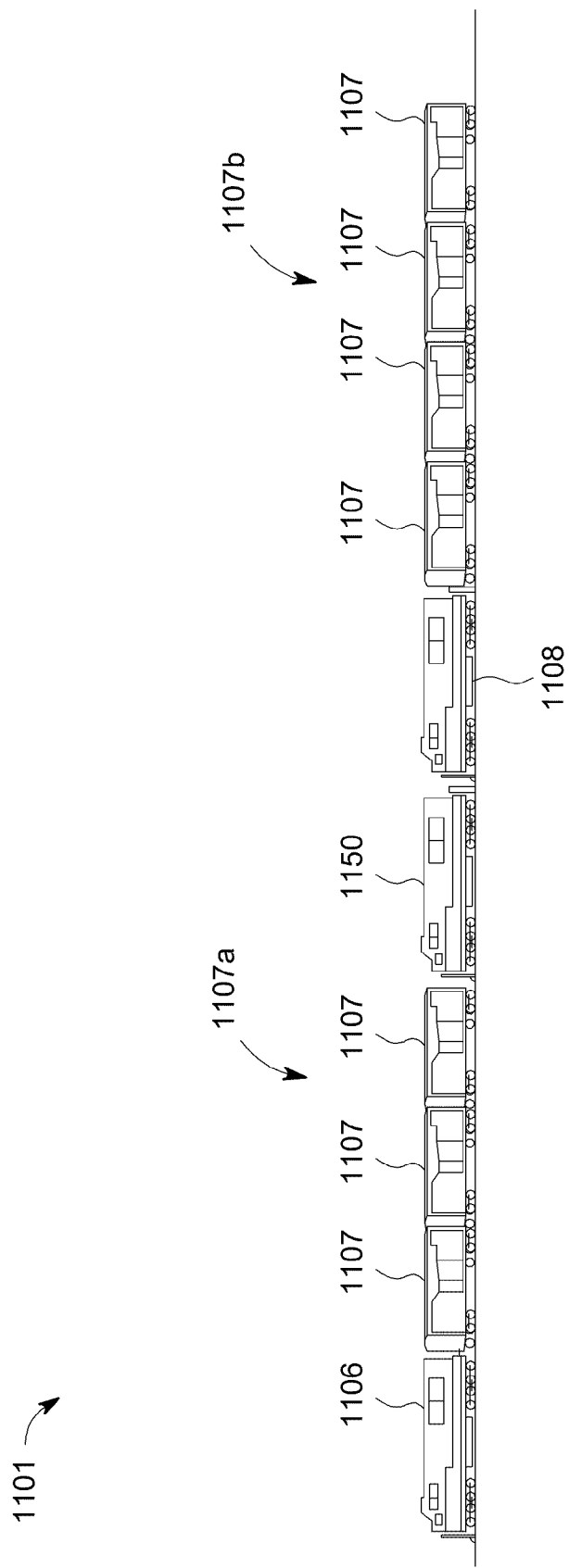
FIGS. 6-8 are schematic diagrams of rail vehicle consists, which describe additional aspects of various embodiments of the invention.

FIG. 6 illustrates operations of an embodiment of the method 300 and system 1100. Here, a rail vehicle consist 1101 (e.g., train) includes a first locomotive 1108, a second locomotive 1150, and a third locomotive 1106. The train 1101 may also include a plurality of rail cars 1107, e.g., a first plurality 1107a positioned between the third and second locomotives 1106, 1150 and a second plurality 1107b positioned after the first locomotive 1108. In this example, the third locomotive 1106 is a lead locomotive, because it is leading the train and is (typically) where the operator is located. The second locomotive 1150 is a remote locomotive, because it is remotely located from the lead locomotive 1106 (i.e., spaced apart by the rail cars 1107a), and may be unmanned. The first locomotive 1108 is also a remote locomotive, since it too is remotely located from the lead locomotive and may be unmanned. The second locomotive 1150 operates with its brake valve cut-in, according to the regular mode of distributed power operations on the train. The first locomotive 1108 is designated for operation in the remote trail mode, and, thereby, the first locomotive 1108 is operated with its brake valve normally cut-out, preventing the interaction of the brake systems of the two adjacent locomotives 1150, 1108. When a brake application or brake release command (service brake, emergency brake, and/or penalty brake) is received by the first locomotive 1108, it cuts in its brake valve to assist with the brake application or release and then reverts back to the brake valve cut-out mode.

Figure 7:
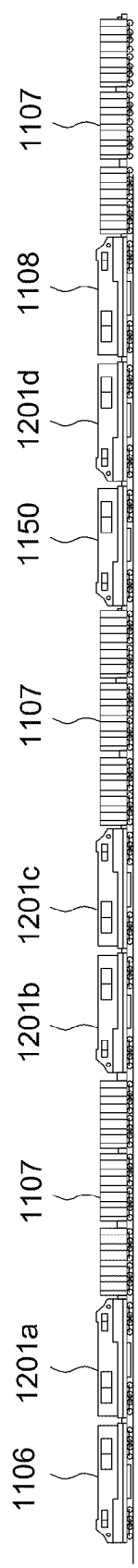

FIG. 7 illustrates operations of another embodiment of the method 300 and system 1100, where a remote trail locomotive is operated with its brake valve normally cut-out, but controlled to cut-in its brake valve to assist in service brake applications, penalty brake applications, and emergency brake applications. The train includes a first (remote-designated) locomotive 1108, a second (remote-designated) locomotive 1150, a third (lead) locomotive 1106, additional locomotives 1201a, 1201b (remote-designated), 1201c, 1201d, and unpowered rail cars 1107. The first locomotive 1108 is designated for operation in the remote trail mode. (As noted above, the first locomotive 1108, although not directly next to the second locomotive 1150, is adjacent to the second locomotive 1150, by virtue of being separated from the second locomotive by a locomotive (powered vehicle) 1201d but not unpowered vehicles.) Traction is controlled at the lead locomotive 1106 and at the remote-designated locomotives 1201b, 1150, and 1108. Automatic brakes are controlled at locomotives 1106, 1201b, and 1150. Upon a penalty brake application or emergency brake application, brakes are applied at locomotives 1106, 1201b, and 1150. Additionally, the brake valve at the first locomotive 1108 is cut-in to effectuate the brake application also at the first locomotive 1108. During independent distributed power operations, locomotives 1150 and 1108 are grouped to be moved/controlled together. The remote trail locomotive 1108 retains fraction control and dynamic braking operational functionality even during a communication loss.

In another embodiment, a remote trail locomotive may be operated as a stand-alone remote trail locomotive without being tandem to another remote locomotive and only cut-in its brake valve and apply brakes for an emergency brake application but not a service or penalty brake application. For example, again with reference to FIG. 7, the locomotive 1201b is designated as a remote trail, and normally operates with its brake valve in cut-out mode. Locomotive 1106 is the lead locomotive, and locomotive 1150 is a designated remote. Locomotive 1108 in this example is not designated as a remote or remote trail. Traction is controlled at locomotives 1106, 1201b, and 1150. Upon a service brake application or a penalty brake application, brakes are applied at locomotives 1106 and 1150, but not at remote trail locomotive 1201b. Upon an emergency brake application, brakes are applied at locomotives 1106 and 1150, and also at remote trail locomotive 1201b, which cuts-in its brake valve for this purpose during the emergency brake application. For independent control in distributed power, there is no grouping, and each remote 1106, 1201b, and 1150 is controlled individually. The remote trail locomotive 1201b retains traction control and dynamic braking operational functionality even during a communication loss. It should be noted that in this example, locomotive 1201b is designated as a remote trail even though it is not behind an adjacent locomotive 1201c. This illustrates that the invention is not limited (unless otherwise specified) to designating a locomotive or other powered vehicle for remote trail operations only when it is behind an adjacent powered vehicle.

Figure 8:
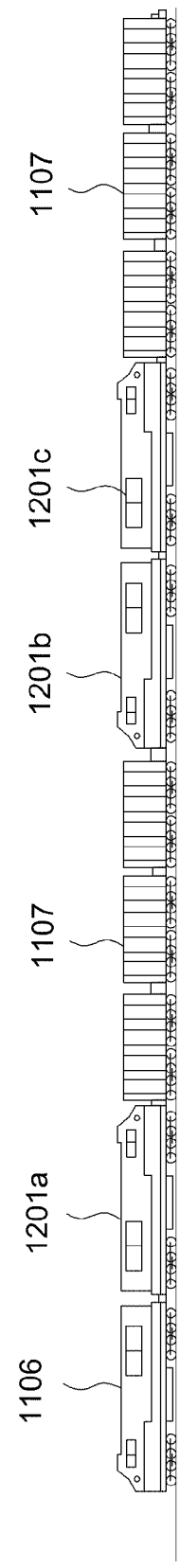

In another embodiment, with reference to FIG. 8, a locomotive 1201a that is adjacent to a lead locomotive 1106 is designated for operation in the remote trail mode. Here, the locomotive 1201a normally operates with its brake valve cut out. In operation, the locomotive 1201a cuts-in its brake valve during a service brake application, penalty brake application, and/or emergency brake application, and once the braking operation is over controls its brake valve back to cut-out mode. In one embodiment, for so long as the locomotive 1201a is designated for operation as a remote trail, the locomotive 1201a only cuts-in its brake valve during an emergency brake application. Traction is controlled at lead locomotive 1106, at the remote trail locomotive 1201a, and at a remote locomotive 1201b. Automatic brakes are controlled at the lead locomotive 1106 and at the remote locomotive 1201b. Penalty brakes are applied at the lead locomotive 1106 and at the remote locomotive 1201b. Emergency brakes are applied at the lead locomotive, at the remote locomotive 1201b, and at the remote trail 1201a. Remote trail 1201a retains traction and dynamic braking during communication loss.

In an embodiment, more than one locomotive in a train may be designated for operation in the remote trail mode. For example, in FIG. 8, locomotive 1106 is the lead locomotive, and locomotive 1201b operates as a distributed power remote locomotive. Locomotives 1201a and 1201c are each designated as a remote trail. Here, both remote trail locomotives 1201a and 1201c normally operate with their respective brake valves cut out. Traction is controlled at the lead locomotive, at the remote locomotive, and at the remote trail locomotives. Automatic brakes are controlled at the lead locomotive and at the remote locomotive. During a service brake application, a penalty brake application, and/or an emergency brake operation, each remote trail locomotive 1201a, 1201c is controlled to cut-in its brake valve to assist in the operation. (In one embodiment, service and penalty brake applications are applied only at the lead and remote locomotives, and not at the remote trails; instead, the remote trails are only operated to brake valve cut-in mode to assist during emergency brake applications.) During independent control, the remote locomotive 1201b and its adjacent remote trail 1201c are moved/controlled together. Both remote trails maintain traction control and dynamic braking commands during communication loss.

As discussed above, at certain times a remote trail locomotive (e.g., locomotive 1108 in FIG. 2) is controlled to be in a brake valve cut-out mode. In standard distributed power systems, this would be disadvantageous during a communication loss state of the distributed power communication system. ("Communication loss state" refers to a state or condition of the distributed power communication system where distributed power communications cannot be transmitted between two locomotives, due to signal interference, component failure, or the like.) In particular, in a standard distributed power system, upon the occurrence of a communication loss state, a remote locomotive with its brake value in a cut-out mode would throttle down to an idle state, disadvantageously limiting the operational capabilities of the remote locomotive.

Figure 9:
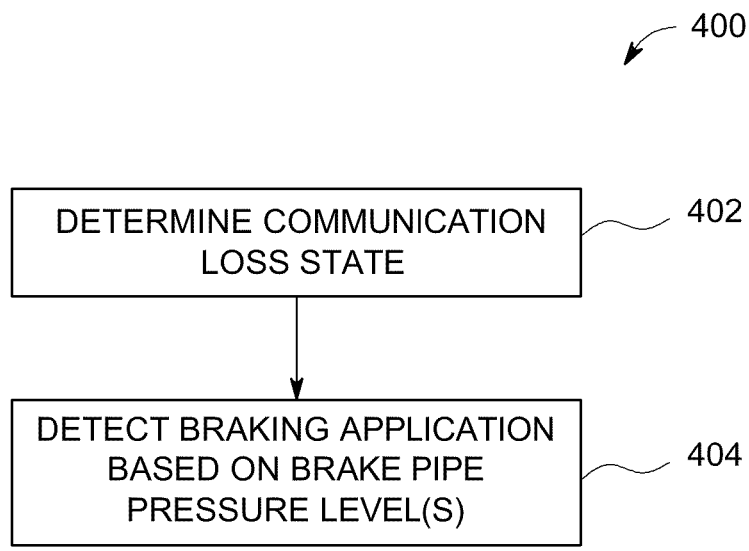
FIGS. 9 and 10 are flowcharts illustrating methods for controlling a distributed power rail vehicle consist, according to embodiments of the present invention.

Accordingly, with reference to FIG. 9, another embodiment of the present invention relates to a method 400 for controlling a distributed power rail vehicle. The method comprises, at a first locomotive 1108 in a train 1101, determining that a distributed power communication system of the train has entered a communication loss state, as at Step 402. As noted above, "communication loss state" refers to a state or condition where distributed power communications cannot be transmitted between the first locomotive 1108 and a second, remote locomotive 1106. This may be due to signal interference, component failure, or the like. During the communication loss state, and if a brake pipe valve 1136 of the first locomotive 1108 is in a cut-out mode, a braking application in the train 1101 is detected at the first locomotive 1108, as at Step 404. The braking application is detected based on pressure levels "P" in the train brake pipe 1110 at the first locomotive 1108 and excluding brake pipe flow data (i.e., braking application is detected without using brake pipe flow data). "Brake pipe flow data" is data relating to brake pipe charging rates, determined by analyzing differential pressures across a pipe restriction. In particular, with the brake pipe value of a typical locomotive in a cut-out mode, it is not possible to measure brake pipe charging rates. Thus, in certain embodiments of the present invention, braking applications are determined based solely on brake pipe pressure levels P (psi or kPa) and not on flow rates (scfm, psi-differential, or kPa-differential), for example, as measured at a single point 1112 in the brake pipe 1110 in the first locomotive 1108. In an embodiment, during a communication loss state, the remote trail locomotive will continue in the same throttle state until a braking application is detected, and then it will idle down.

As should be appreciated, the method 400 enables a remote locomotive to detect braking applications in a train during a communication loss, despite the remote locomotive being in a brake pipe value cut-out mode. This enables the remote locomotive to be controlled in a manner other than an idle mode, for enhanced train performance during the braking application, e.g., the remote locomotive may be controlled to a throttle up state, throttle down, regenerative/dynamic braking, or the like.

Figure 10:
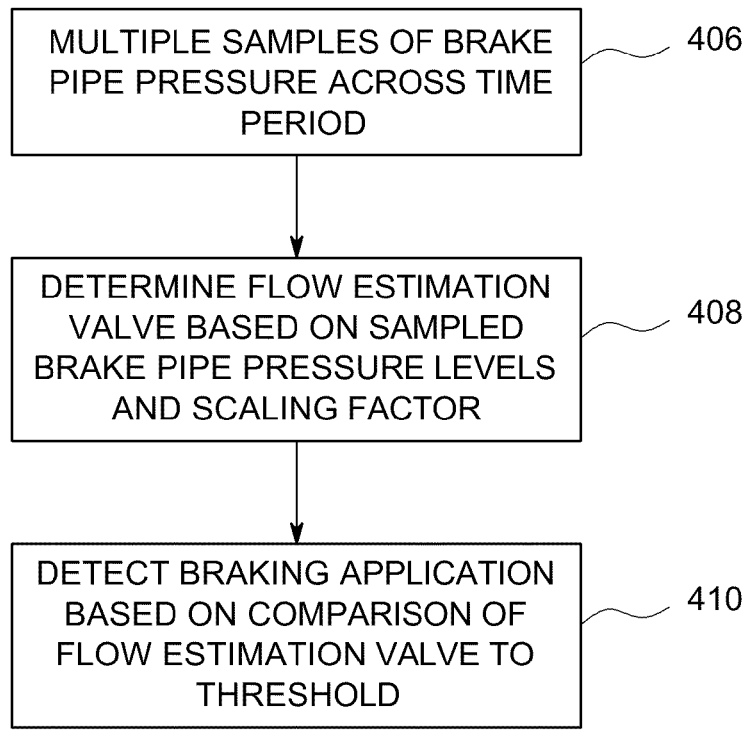
Figure 11:
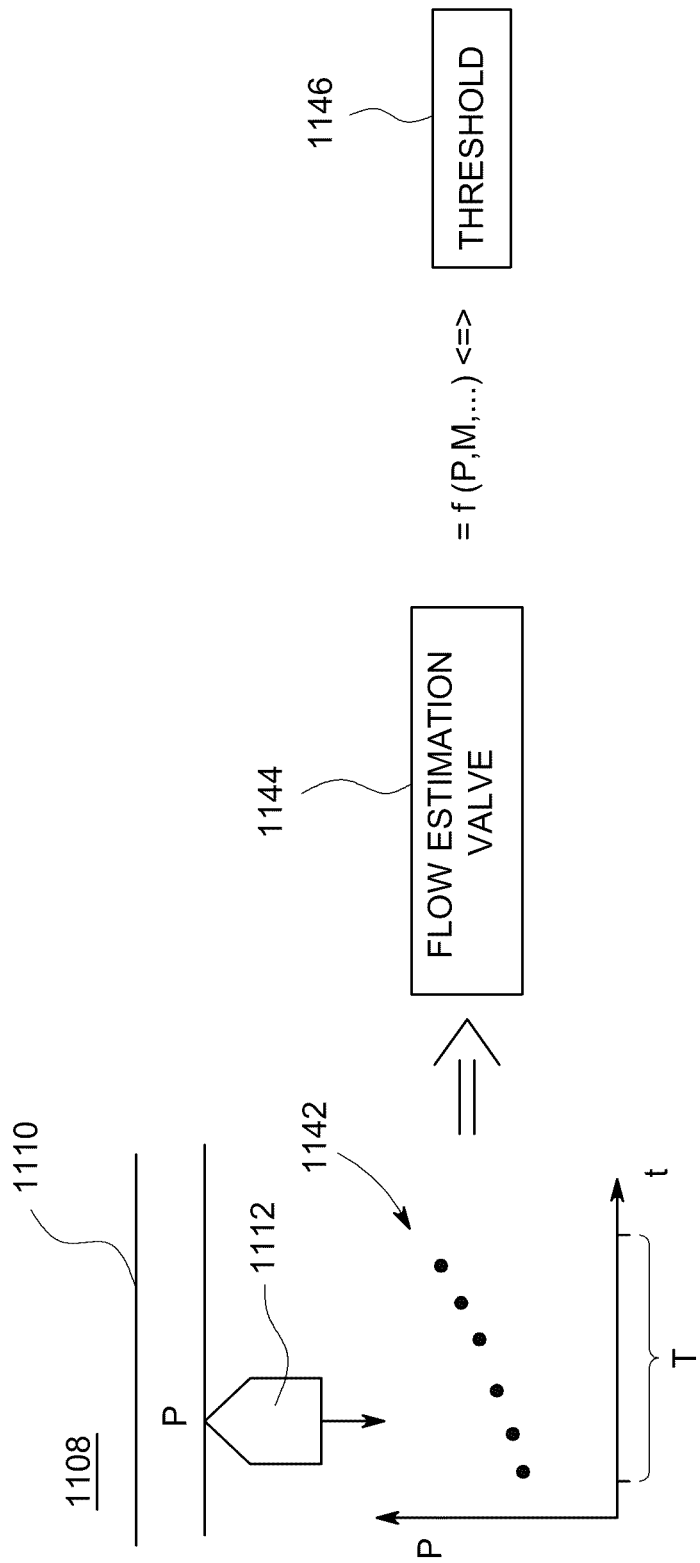
FIG. 11 is a schematic diagram illustrating pressure samples and the determination of a flow estimation value, according to an embodiment of the present invention.

In another embodiment, with reference to FIGS. 10 and 11, the brake pipe pressure levels P are determined by taking multiple samples 1142 of a pressure level P in the brake pipe 1110 across a time period "T," as at Step 406. For example, the sampling might comprise 60 samples taken over a time period of 30 seconds. In another examples, samples are taken at 0.5 seconds apart, across some other time period. (For example, to cover the case when the brakes are released and a less sensitive flow algorithm is needed, an integration time of 16 seconds/32 samples may be used.) This flow algorithm is defined as the 8/16 p.4 algorithm. A flow estimation value 1144 is determined based on the sampled brake pipe pressure levels 1142 and a scaling factor "M," as at Step 408. The braking application is detected based on a comparison of the flow estimation value 1144 to a designated threshold 1146, as at Step 410. For example, if the flow estimation value 1144 is above the threshold 1146, this results in a determination that a braking application has occurred. In one embodiment, the flow estimation value is determined by scaling the brake pipe pressure levels according to the scaling factor M, and integrating the scaled brake pipe pressure levels over the time period T. "Integrating" refers to an integration operation, summation, or similar operation.

The methods of FIGS. 9-11 are applicable for use in any remote distributed power locomotive, including "regular" remotes and remotes in a "remote trail" mode as described above. It is also applicable for locomotives that have no remote air brake control.

In one embodiment, the flow estimation value 1144 is determined according to the following:

$$\text{Flow estimation value} = \text{SUM}[-M^*(BP_1-BP_0), -M^*(BP_2-BP_0), \ldots -M^*(BP_{60}-BP_0)]$$

Here, the value of the flow estimation value is in units of pound-seconds. "M" is the scaling factor, and "BPn" (n=0, 1, 2, ...) is the pressure level in the brake pipe 1110, measured at a point 1112 in the brake pipe at a discreet time point "n" (n thereby also being a sample number). The scaling factor M is used to account for not having flow data, e.g., for equalizing the flow estimation value to a flow value determined using flow data. This allows the flow estimation value to be used in a distributed power system that is configured to use flow values that were determined based on flow data (for example, the LOCOTROL® system). In one embodiment, M has a value of 0.7. In another embodiment, M has a value of 0.4. For a given rail vehicle system, M can be determined by setting M equal to the scaling factor used in an existing flow value calculation algorithm (one that incorporates flow data), comparing the results of the two algorithms (both run using the same scaling factor, but one including flow data and the other not), and adjusting M to match the sensitivity/level of the existing flow value calculation algorithm.

Once the flow estimation value 1144 is determined (e.g., calculated in the above manner), the flow estimation value 1144 is then compared to a threshold value 1146. If the threshold value 1146 is exceeded, then that is interpreted as the brakes being applied. This is similar to how flow values are evaluated in the system in U.S. Pat. No. 4,553,723, which is incorporated by reference herein in its entirety. For example, in both the equation above and in the system in U.S. Pat. No. 4,553,723, the output is pound-seconds, and this is compared to a threshold level in pound-seconds, such as 8 pound-seconds.

As noted, the methods of FIGS. 9-11 are applicable for locomotives that have no remote air brake control. (That is, locomotives that have air brakes, but the air brakes cannot be controlled using distributed power communications.) Thus, another embodiment relates to a method for controlling a distributed power train having a first locomotive (e.g., a remote locomotive without remote air brake control), a second locomotive (e.g., a lead locomotive), and a brake pipe connecting the first and second locomotives. The first locomotive is remote from the second locomotive. The method comprises, when a brake pipe valve of the first locomotive is in a cut-out mode, detecting a braking application in the train at the first locomotive. The braking application is detected based on pressure levels in the train brake pipe at the first locomotive and excluding brake pipe flow data.

Although embodiments of the invention have been described herein with respect to trains, any of the embodiments (or variations or combinations thereof) herein are applicable to rail vehicle consists and other vehicle consists generally. Thus, any instances where the term "train" is used herein, this should be understood as a specific example of one type of vehicle consist, for illustration purposes, and is not meant to be limiting. Additionally, although embodiments of the invention have been described herein with respect to locomotives, any of the embodiments (or variations or combinations thereof) herein are applicable to powered rail vehicles generally. Thus, any instances where the term "locomotive" is used herein, this should be understood as a specific example of one type of powered rail vehicle, for illustration purposes, and is not meant to be limiting.

In an embodiment, locomotives that are designated for operation as remote trails are normally controlled for their respective brake valves to be cut in to assist in penalty brake applications and emergency brake applications. However, in an operational mode of the system, penalty brake assistance may be selectively disabled.

During the remote trail mode of operation, any unexpected flow communication check messages (of the distributed power system) may need to be delayed 1-2 seconds to prevent collisions with an adjacent remote's unexpected flow communication check message. In an embodiment, when a lead distributed power locomotive (meaning not necessarily the front locomotive, but a locomotive that coordinates/controls distributed power operations in a train) runs a brake pipe continuity test and receives remote reply messages (with time tags) from other locomotives, if the time tag of a remote trail-designated locomotive is within approximately +1-2 seconds of another remote locomotive's time tag, then the remote trail locomotive will be assigned to the same independent control group as the other remote. They will then be moved/controlled together during independent control operations. If the time tag of the remote trail locomotive is greater than approximately 1-2 seconds of the other remote's time tag, then the remote trail locomotive will not be grouped with any other remote and will function the same as other remotes.

In any of the aforementioned embodiments, a locomotive may be configured to automatically control itself for remote trail operation (e.g., brake valve normally cut out expect for assisting in penalty and/or emergency brake applications) upon receipt of a communication that it has been designated for operation in the remote trail mode. A locomotive that has been designated for remote trail operation may communicate with another locomotive for confirming this status and/or for otherwise carrying out coordinated distributed power operations.

As noted above, "adjacent" means directly adjacent to, or not directly adjacent to but not separated by unpowered rail cars (i.e., adjacent means directly adjacent, or possibly spaced apart by one or more locomotives or other powered rail vehicles but not by unpowered rail vehicles). The term "rail vehicle consist" refers to a group of vehicles that are linked together to travel along a guideway, e.g., a train that moves along a set of rails. "Powered" rail vehicle refers to a rail vehicle capable of self-propulsion, e.g., a locomotive.

The term "service" brakes refers to the train brakes that are typically applied and released by the operator during normal operations. This braking allows the operator to reduce the brake pipe from the normal release pressure (typically 90 psi) to full service pressure (64 psi for a 90 psi release pressure) at a controlled (service) rate such that the train brakes apply but the train emergency valves are not tripped. The service brake application allows the operator to gradually apply the train brakes from a minimum braking effort to the maximum (non-emergency) braking effort. A full service brake application utilizes the car auxiliary reservoirs to provide the maximum (non-emergency) braking effort available for the train.

The term "penalty" brakes refers to a braking operation that is carried out, typically automatically by the train safety equipment, upon the occurrence of one or designated criteria (which are not necessarily emergency conditions). These conditions include the operator alerter/vigilance equipment, train over speed detection, etc. Penalty brake applications reduce the brake pipe to 0 psi at the same controlled rate as service brake applications (again, so as to not trip the train emergency valves). Penalty brake applications utilize the car auxiliary reservoirs to apply the maximum non-emergency braking effort.

The term "emergency" brakes refers to applying brakes rapidly and possibly automatically in the event of a brake pipe failure or an emergency application by the operator. Emergency brake applications vent the brake pipe to 0 psi at a very fast (emergency) rate which then trips the emergency valves on the cars within the train. As each car detects the emergency drop in brake pipe, it propagates the emergency application down the train at a very fast rate and sets the entire train brake pipe to 0 psi in a matter of seconds. Also, emergency brake applications utilize both the car auxiliary and emergency reservoirs to apply additional braking effort from the car emergency reservoirs to increase the braking effort of the train by 20%, giving not only much faster braking but also much stronger braking.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described communications system and method for a rail vehicle, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for controlling a distributed power rail vehicle consist including a first powered rail vehicle, a second powered rail vehicle and a third powered rail vehicle, the method comprising:
   at the third powered rail vehicle in the rail vehicle consist, designating the first powered rail vehicle in the rail vehicle consist for operation as a remote trail;
   based on said designation, automatically operating a brake pipe valve of the first powered rail vehicle to a cut-out mode;
   upon initiation of a service, an emergency, and/or a penalty brake application in the rail vehicle consist, automatically operating the brake pipe valve of the first powered rail vehicle to a cut-in mode; and
   upon completion of the service, emergency, and/or penalty brake application in the rail vehicle consist, automatically operating the brake pipe valve of the first powered rail vehicle back to the cut-out mode.

2. The method of claim 1 wherein the first powered rail vehicle is located adjacent to the second powered rail vehicle in the rail vehicle consist, and the first and second powered rail vehicles are remote from the third powered rail vehicle.

3. The method of claim 2 wherein so long as the first powered rail vehicle is designated for operation as a remote trail, the brake pipe valve of the first powered rail vehicle is operated to the cut-in mode only for service, emergency, and/or penalty brake applications in the rail vehicle consist and is otherwise operated to remain in the cut-out mode.

4. The method of claim 3 further comprising:
   at the first powered rail vehicle, determining that a distributed power communication system of the rail vehicle consist has entered a communication loss state preventing the transmission of distributed power communications between the first powered rail vehicle and the third powered rail vehicle; and
   during the communication loss state, and if the brake pipe valve of the first powered rail vehicle is in the cut-out mode, detecting a braking application in the rail vehicle consist at the first powered rail vehicle, wherein the braking application is detected based on at least one pressure level in the rail vehicle consist brake pipe at the first powered rail vehicle and excluding brake pipe flow data.

5. The method of claim 2 wherein the brake pipe valve of the first powered rail vehicle is operated to the cut-in mode only upon initiation of an emergency brake application in the rail vehicle consist and not during a service or penalty brake application.

6. The method of claim 2 further comprising:
   designating a fourth powered rail vehicle in the rail vehicle consist for operation as a remote trail;
   based on said designation, automatically operating a brake pipe valve of the fourth powered rail vehicle to the cut-out mode;
   upon initiation of a service, an emergency, and/or a penalty brake application in the rail vehicle consist, automatically opening the brake pipe valve of the fourth powered rail vehicle to the cut-in mode; and
   upon completion of the service, emergency, and/or penalty brake application in the rail vehicle consist, automatically operating the brake pipe valve of the fourth powered rail vehicle back to the cut-out mode.

7. The method of claim 6 wherein the third powered rail vehicle is a lead vehicle of the rail vehicle consist, and the fourth powered rail vehicle is directly next to and behind the third powered rail vehicle.

8. The method of claim 1 wherein the third powered rail vehicle is a lead vehicle of the rail vehicle consist, and the first powered rail vehicle is directly next to and behind the third powered rail vehicle.

9. The method of claim 1, wherein the first powered vehicle is located adjacent to the second powered vehicle in the rail vehicle consists, and a default state of the brake pipe valve of the second powered vehicle is automatically operated to a cut-in mode.

10. A method for controlling a distributed power rail vehicle consist, the method comprising:
    designating each of at least one powered rail vehicle in the rail vehicle consist for operation as a remote trail;
    based on said designation, automatically operating a respective brake pipe valve of each of the at least one powered rail vehicle to a cut-out mode;
    upon initiation of a service, an emergency, and/or a penalty brake application in the rail vehicle consist, automatically operating the respective brake pipe valve of each of the at least one the powered rail vehicle to a cut-in mode; and
    upon completion of the service, emergency, and/or penalty brake application in the rail vehicle consist, automatically operating the respective brake pipe valve of each of the at least one powered rail vehicle back to the cut-out mode.

11. The method of claim 10 wherein so long as each of the at least one powered rail vehicle is designated for operation as a remote trail, the respective brake pipe valve of each of the at least one powered rail vehicle is operated to the cut-in mode only for service, emergency, and/or penalty brake applications in the rail vehicle consist and is otherwise operated to remain in the cut-out mode.

12. A method for controlling a distributed power rail vehicle consist, the method comprising:
at a first powered rail vehicle in the rail vehicle consist, determining that a distributed power communication system of the rail vehicle consist has entered a communication loss state preventing transmission of distributed power communications between the first powered rail vehicle and a second, remote powered rail vehicle; and
during the communication loss state, and if a brake pipe valve of the first powered rail vehicle is in a cut-out mode, detecting a braking application in the rail vehicle consist at the first powered rail vehicle, wherein the braking application is detected based on at least one brake pipe pressure level in a rail vehicle consist brake pipe at the first powered rail vehicle and excluding brake pipe flow data.

13. The method of claim 12 wherein during the communication loss state, the first powered rail vehicle is maintained in a current throttle state of the first powered rail vehicle until the braking application is detected, and after the braking application is detected the first powered rail vehicle is controlled to an idle mode of operation.

14. The method of claim 12 further comprising controlling the first powered rail vehicle based on the detected braking application.

15. The method of claim 12 further comprising:
determining the at least one brake pipe pressure level by taking multiple samples of a pressure level in the brake pipe across a time period;
determining a flow estimation value based on the multiple samples and a scaling factor; and
detecting the braking application based on a comparison of the flow estimation value to a designated threshold.

16. The method of claim 15 wherein the flow estimation value is determined by scaling the at least one brake pipe pressure level according to the scaling factor, and integrating the at least one brake pipe pressure level, as scaled, over the time period.

17. The method of claim 12 wherein each of the at least one brake pipe pressure level is measured at a single point in the brake pipe in the first powered rail vehicle.

18. A method for controlling a rail vehicle consist having a first powered rail vehicle, a second powered rail vehicle, and a brake pipe connecting, the first and second powered rail vehicles, and the first powered rail vehicle being remote from the second powered rail vehicle, the method comprising:
when a brake pipe valve of the first powered rail vehicle is in a cut-out mode, detecting a braking application in the rail vehicle consist at the first powered rail vehicle;
wherein the braking application is detected based on brake pipe pressure levels in the rail vehicle consist brake pipe at the first powered rail vehicle and excluding brake pipe flow data.

19. The method of claim 18 wherein the first powered rail vehicle is maintained in a current throttle state of the first powered rail vehicle until the braking application is detected, and after the braking application is detected the first powered rail vehicle is controlled to an idle mode of operation.

20. A method for controlling a distributed power rail vehicle consist including a first powered rail vehicle, a second powered rail vehicle and a third powered rail vehicle, wherein the first powered rail vehicle is located adjacent to the second powered rail vehicle in the rail vehicle consist, and the first and second powered rail vehicles are remote from the third powered rail vehicle, the method comprising:
at the third powered rail vehicle in the rail vehicle consist, designating the first powered rail vehicle the rail vehicle consist for operation as remote trail;
based on said designation, automatically operating a brake pipe valve of the first powered rail vehicle to a cut-out mode;
upon initiation of an emergency brake application in the rail vehicle consist, automatically operating the brake pipe valve of the first powered rail vehicle to a cut-in mode; and
upon completion of the emergency brake application in the rail vehicle consist, automatically operating the brake pipe valve of the first powered rail vehicle back to the cut-out mode, wherein so long as the first powered rail vehicle is designated for operation as a remote trail, the brake pipe valve of the first powered rail vehicle is operated to the cut-in mode only for emergency brake applications in the rail vehicle consist and is otherwise operated to remain in the cut-out mode.

* * * * *

UNITED STATES PATENT AND TRADEMARK OFFICE
CERTIFICATE OF CORRECTION

PATENT NO. : 8,500,214 B2
APPLICATION NO. : 12/688496
DATED : August 6, 2013
INVENTOR(S) : Smith et al.

It is certified that error appears in the above-identified patent and that said Letters Patent is hereby corrected as shown below:

In the Specification

In Column 13, Line 65, delete "fraction" and insert -- traction --, therefor.

In the Claims

In Column 20, Line 32, in Claim 6, delete "opening" and insert -- operating --, therefor.

In Column 21, Line 14, in Claim 12, delete "toss" and insert -- loss --, therefor.

In Column 22, Line 6, in Claim 18, delete "connecting," and insert -- connecting --, therefor.

In Column 22, Line 28, in Claim 20, delete "vehicle the" and insert -- vehicle in the --, therefor.

In Column 22, Line 29, in Claim 20, delete "operation as" and insert -- operation as a --, therefor.

Signed and Sealed this
First Day of October, 2013

Teresa Stanek Rea
*Deputy Director of the United States Patent and Trademark Office*